J. A. GOULD.
Yarn Beam.

No. 165,666.

Patented July 20, 1875.

UNITED STATES PATENT OFFICE.

JOHN A. GOULD, OF STURBRIDGE, MASSACHUSETTS.

IMPROVEMENT IN YARN-BEAMS.

Specification forming part of Letters Patent No. 165,666, dated July 20, 1875; application filed June 2, 1875.

*To all whom it may concern:*

Be it known that I, JOHN A. GOULD, of Sturbridge, in the county of Worcester, State of Massachusetts, have invented a certain new and useful Improvement in Yarn-Beams, of which the following is a description sufficiently full, clear, and exact to enable any person skilled in the art or science to which my invention appertains to make and use the same, reference being had to the accompanying drawing forming a part of this specification, in which—

Figure 1:
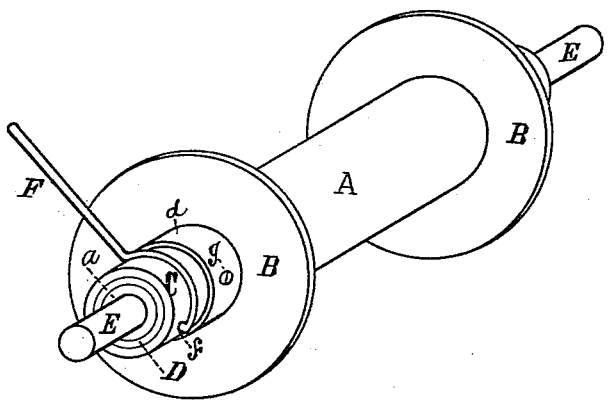
Figure 2:
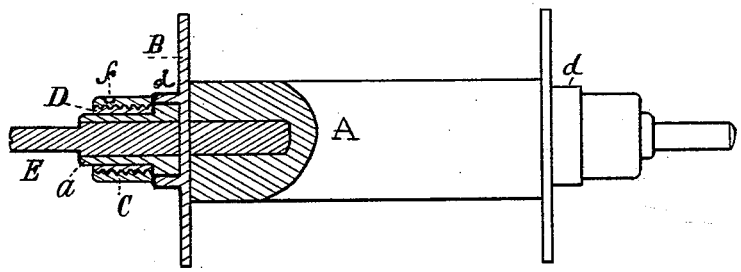

Figure 1 is an isometrical perspective view, and Fig. 2 a vertical longitudinal section.

Like letters of reference indicate corresponding parts in the different figures of the drawing.

My invention relates to means for firmly securing the heads in position on the beam, and also for protecting and re-enforcing the hub of the beam itself; and consists in a novel construction and arrangement of the parts, as hereinafter more fully set forth and claimed, by which a simpler and more effective device of this character is produced than has heretofore been employed.

In most yarn-beams, as ordinarily constructed, the body of the beam projects beyond the heads, forming hubs, in which the journals or axles are disposed. These hubs soon become bruised and battered, and frequently split, permitting the axles to work loose, and cause the beam to run eccentrically or out of truth. The heads are also frequently disengaged from the beam, or work loose thereon by rough usage, causing much annoyance and a great waste of yarn.

My improvement is designed to obviate these difficulties and objections; and to that end I make use of instrumentalities which will be readily understood by all conversant with such matters from the following description:

In the drawing, A represents the body of the beam; B B, the heads, and E E the journals or axles. The body is cylindrical in form, and has a rabbet or shoulder formed near each end, against or on which the heads are secured by the screws $g$ passing through annular flanges $d$, which project laterally therefrom. The body is also elongated or extended beyond the flanges to form the hub $a$, the extended portion being reduced in size and re-enforced with the thimble D, which is secured to the same by screws or pins, (not shown,) and exteriorly threaded to receive the nut C. In the manufacture of the beam the hub $a$ should be made of such a size that when the thimble D is in place, and the nut C turned off, the head B may be readily removed without detaching the thimble.

It will be obvious that the thimble not only acts to strengthen the hub and prevent the same from splitting, thus affording a firm support to the journal D, but, in conjunction with the nut C, operates to prevent the loosening or accidental displacement of the head. It will also be obvious that the flanges $d$ may be arranged to project inwardly, if preferred, without entirely departing from the spirit of my invention.

A bent lever or wrench, F, engaging the slot or aperture $f$, may be conveniently used for turning the nut on and off, as occasion requires.

Having thus explained my improvement, what I claim is—

A yarn-beam having the body A, head B, thimble D, nut C, and journal E, constructed and arranged to operate substantially as and for the purpose set forth and specified.

JOHN A. GOULD. [L. S.]

Witnesses:
  G. N. BACON,
  W. P. HOOKER.